(12) United States Patent
Shikina (10) Patent No.: US 11,843,887 B2
(45) Date of Patent: Dec. 12, 2023

(54) PHOTOELECTRIC CONVERSION APPARATUS, PHOTOELECTRIC CONVERSION SYSTEM, MOVING BODY, AND SEMICONDUCTOR SUBSTRATE

(71) Applicant: CANON KABUSHIKI KAISHA, Tokyo (JP)

(72) Inventor: Noriyuki Shikina, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 44 days.

(21) Appl. No.: 17/554,611

(22) Filed: Dec. 17, 2021

(65) Prior Publication Data
US 2022/0210359 A1 Jun. 30, 2022

(30) Foreign Application Priority Data
Dec. 24, 2020 (JP) .................................. 2020-215242

(51) Int. Cl.
| | | |
|---|---|---|
| *H04N 25/75* | (2023.01) | |
| *G05D 1/02* | (2020.01) | |
| *H04N 25/65* | (2023.01) | |
| *H04N 25/79* | (2023.01) | |
| *H04N 25/616* | (2023.01) | |

(52) U.S. Cl.
CPC .......... *H04N 25/75* (2023.01); *G05D 1/0246* (2013.01); *H04N 25/616* (2023.01); *H04N 25/65* (2023.01); *H04N 25/79* (2023.01)

(58) Field of Classification Search
CPC ...... H04N 25/75; H04N 25/616; H04N 25/65; H04N 25/79; H04N 25/46; G05D 1/0246; G01S 7/4816; G01S 7/4865
See application file for complete search history.

(56) References Cited

U.S. PATENT DOCUMENTS

| | | | |
|---|---|---|---|
| 2015/0201144 A1* | 7/2015 | Kobayashi | H04N 25/771 348/308 |
| 2019/0081093 A1* | 3/2019 | Matsumoto | H04N 25/772 |
| 2020/0153440 A1* | 5/2020 | Sakurai | H03M 1/56 |
| 2020/0275045 A1* | 8/2020 | Higashi | H03M 1/145 |
| 2021/0377461 A1* | 12/2021 | Hammer | H04N 5/321 |
| 2021/0385402 A1* | 12/2021 | Zhu | H04N 25/75 |

FOREIGN PATENT DOCUMENTS

JP 2018023025 A 2/2018

* cited by examiner

*Primary Examiner* — Michael E Teitelbaum
(74) *Attorney, Agent, or Firm* — CANON U.S.A., INC. IP Division (57) ABSTRACT

An apparatus includes a plurality of pixels, a comparator configured to compare an output signal of each of the plurality of pixels with a reference signal, and a counter of K bits (K is a natural number) configured to operate in parallel with operation of the comparator. The apparatus converts the output signal of each of the plurality of pixels into a digital signal using an output of the comparator and an output of the counter. The apparatus includes an addition unit configured to add a plurality of the digital signals. The addition unit includes a serial binary adder of M bits (M is a natural number less than K).

20 Claims, 8 Drawing Sheets

PHOTOELECTRIC CONVERSION APPARATUS, PHOTOELECTRIC CONVERSION SYSTEM, MOVING BODY, AND SEMICONDUCTOR SUBSTRATE

BACKGROUND

Field of the Disclosure

The aspect of the embodiments relates to a photoelectric conversion apparatus, a photoelectric conversion system provided with the photoelectric conversion apparatus, a moving body, and a semiconductor substrate.

Description of the Related Art

A photoelectric conversion apparatus discussed in Japanese Patent Application Laid-Open No. 2018-23025 includes an analog-to-digital (AD) converter provided with an up/down counter in the individual columns and performs digital addition processing on data sampled a plurality of times.

The digital addition processing adds a plurality of pieces of binary data related to each pixel by pixel with high speed, which causes increasing power consumption of the apparatus. The increasing power consumption is an issue for the photoelectric conversion apparatus.

SUMMARY OF THE DISCLOSURE

According to an aspect of the embodiments, an apparatus includes a plurality of pixels, a comparator configured to compare an output signal of each of the plurality of pixels with a reference signal, and a counter of K bits (K is a natural number) configured to operate in parallel with operation of the comparator. The photoelectric conversion apparatus converts the output signal of each of the plurality of pixels into a digital signal using an output of the comparator and an output of the counter. The photoelectric conversion apparatus includes an addition unit configured to add a plurality of the digital signals. The addition unit includes a serial binary adder of M bits (M is a natural number less than K).

Further features of the disclosure will become apparent from the following description of exemplary embodiments with reference to the attached drawings.

DESCRIPTION OF THE EMBODIMENTS

Some exemplary embodiments of the disclosure will be described in detail below with reference to the attached drawings.

According to each of the exemplary embodiments described below, an image capturing apparatus will be mainly described as an example of a photoelectric conversion apparatus. However, the exemplary embodiments are not limited to the image capturing apparatus and are applicable to other examples of the photoelectric conversion apparatus. Examples of the photoelectric conversion apparatus includes, for example, a ranging apparatus (such as an apparatus in focus detection and distance measurement using time of flight (TOF)) and a photometric apparatus (such as an apparatus in measuring the quantity of incident light).

(Image Capturing Apparatus)

Figure 1:
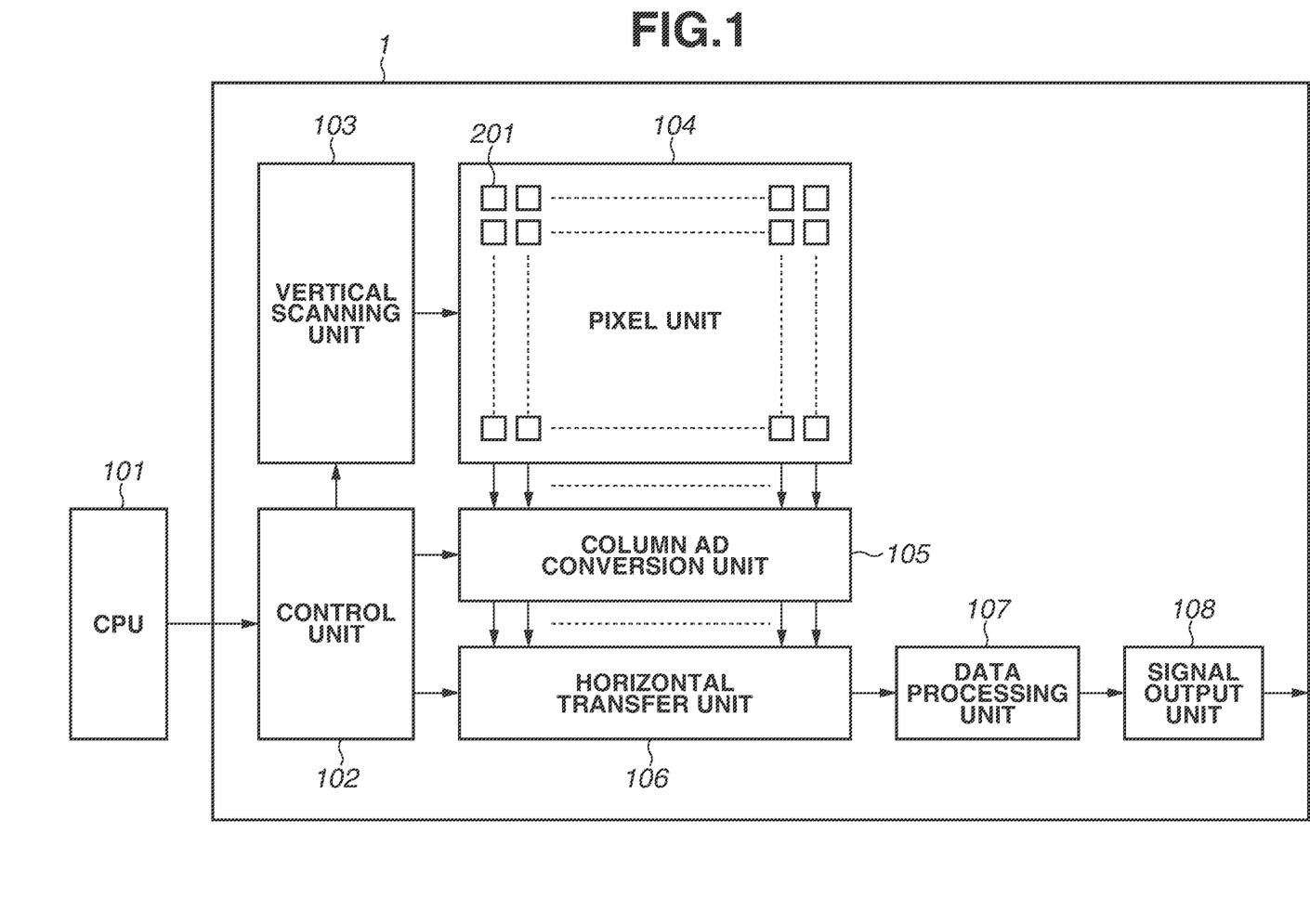
FIG. 1 is a block diagram illustrating an image capturing apparatus according to a first exemplary embodiment.

FIG. 1 is a block diagram illustrating an image capturing apparatus according to a first exemplary embodiment.

An image capturing apparatus 1 illustrated in FIG. 1 includes a control unit 102, a vertical scanning unit 103, a pixel unit 104, a column analog-to-digital (AD) conversion unit 105, a horizontal transfer unit 106, a data processing unit 107, and a signal output unit 108.

The image capturing apparatus 1 is controlled by an external central processing unit (CPU) 101.

The input terminal of the control unit 102 is connected to the output terminal of the CPU 101, and the control unit 102 operates in response to a reception of a synchronization signal output from the CPU 101 through communication. Outputs from the control unit 102 are input to the vertical scanning unit 103, the column AD conversion unit 105, and the horizontal transfer unit 106.

The input terminal of the vertical scanning unit 103 is connected to one output terminal of the control unit 102, and the vertical scanning unit 103 operates in response to a reception of a control signal from the control unit 102. The output terminal of the vertical scanning unit 103 is connected to the pixel unit 104.

A plurality of pixels 201 are arranged in a matrix with n rows and m columns in the pixel unit 104, and n and m are natural numbers.

In response to a reception of a control signal output from the control unit 102, the column AD conversion unit 105 converts an analog signal output from each column of the pixel unit 104 into a digital signal (hereinafter, also referred to as AD conversion).

In response to a receipt of a control signal output from the control unit 102, the horizontal transfer unit 106 transfers the digital signal (digital data) output from the column AD conversion unit 105 to the data processing unit 107.

The data processing unit 107 processes the digital signal transferred from the horizontal transfer unit 106 and outputs the processed digital signal to the signal output unit 108.

The signal output unit 108 outputs a signal of the value corresponding to the output from the data processing unit 107 to the outside as an output of the image capturing apparatus 1.

Figure 2:
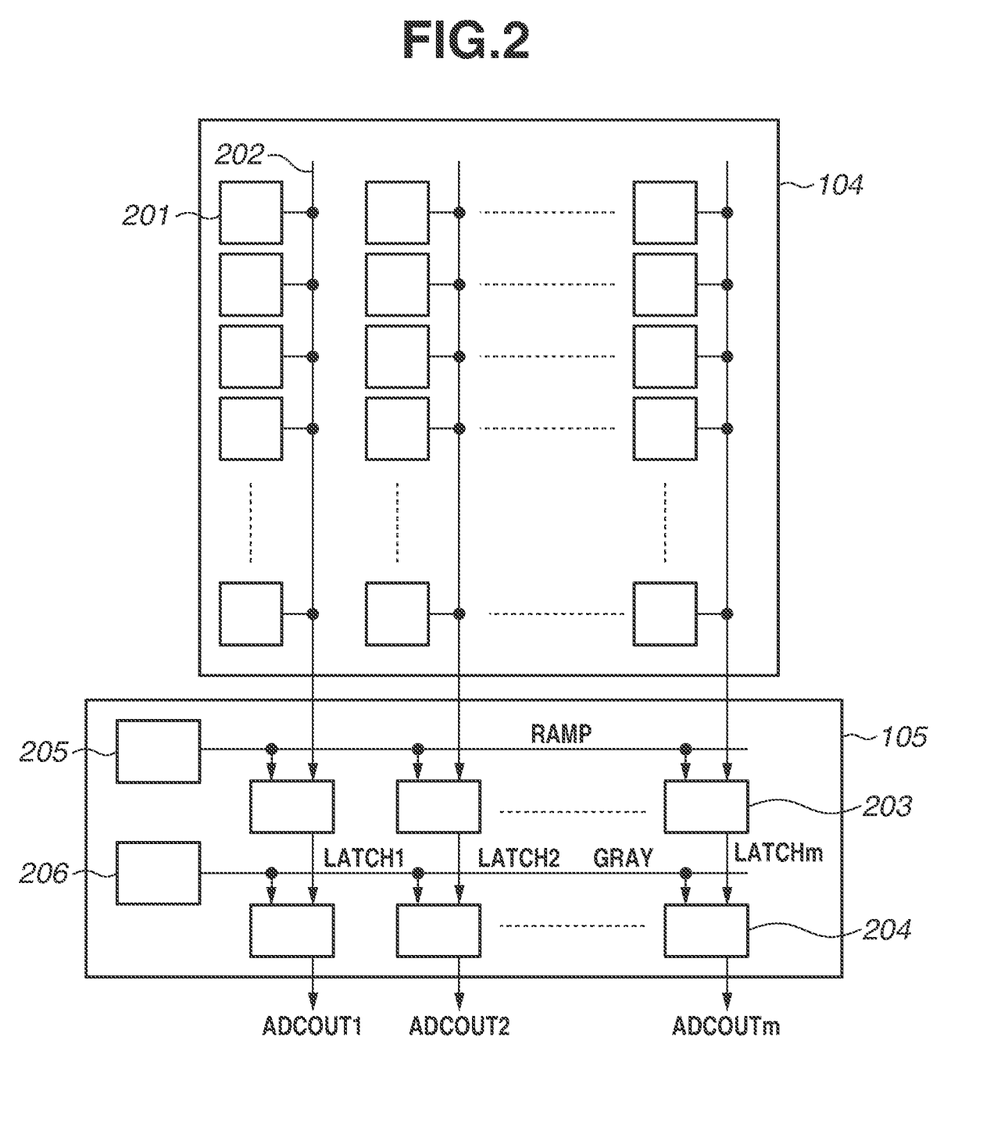
FIG. 2 is a schematic diagram of a pixel unit and a column analog-to-digital (AD) conversion unit of the image capturing apparatus according to the first exemplary embodiment.

FIG. 2 is a schematic diagram of the pixel unit 104 and the column AD conversion unit 105 according to the present exemplary embodiment.

In the pixel unit 104, the pixels 201 are arranged in an array with rows and columns. According to the present exemplary embodiment, the pixel unit 104 in which the pixels 201 are arranged in n rows and m columns will be described as an example. The number of pixels 201 included in the pixel unit 104 is not limited.

Each of the pixels 201 converts incident light into a signal (electric charge) and outputs the signal (a pixel signal) corresponding to the quantity of the incident light. A vertical signal line 202 extending in the column direction (the vertical direction in FIG. 2) is arranged in each column in the pixel unit 104. Each vertical signal line 202 is connected to each of the pixels 201 arranged in the column direction and serves as a signal line common to the pixels 201 arranged in the column direction.

Each vertical signal line 202 is connected to a constant current source (not illustrated). A pixel signal (also referred to as signal charge) read from each of the pixels 201 is input to the column AD conversion unit 105 via the corresponding vertical signal line 202.

Each vertical signal line 202 is connected to the corresponding one of column comparators 203 in the column AD conversion unit 105, and a pixel signal is one of two types of input signals for each column comparator 203. The output LATCH # (#: 1 to m) of each column comparator 203 is connected to the corresponding one of column memories 204.

Further, a ramp signal RAMP common to the columns is input to each column comparator 203 as a reference signal, which is the other input signal of two types of input signals. A ramp signal RAMP is generated by a ramp signal generation unit 205. A ramp signal RAMP may be a signal of which the potential continuously drops over time, a signal of which the potential continuously rises over time, or a signal of which the potential changes in a saw tooth form. Slow change in potential rise is allowed of a signal of which the potential continuously changes.

A gray code GRAY common to the columns is input to each column memory 204. The gray code GRAY is generated by a gray counter 206 and has K bits (K is a natural number, and K=4 according to the present exemplary embodiment).

The gray counter 206 operates in parallel with the operation of column comparators 203. Gray code generation and comparison between a pixel signal and the reference signal performed in parallel allows the gray code GRAY at a timing when the output LATCH # of the column comparators 203 becomes High to be stored. Each column memory 204 outputs a digital signal ADCOUT # (#: 1 to m) in K bits generated using the gray code.

(Pixel Circuit)

The configuration and function of each element of each pixel 201 of the image capturing apparatus 1 according to the present exemplary embodiment will be now described.

Figure 3:
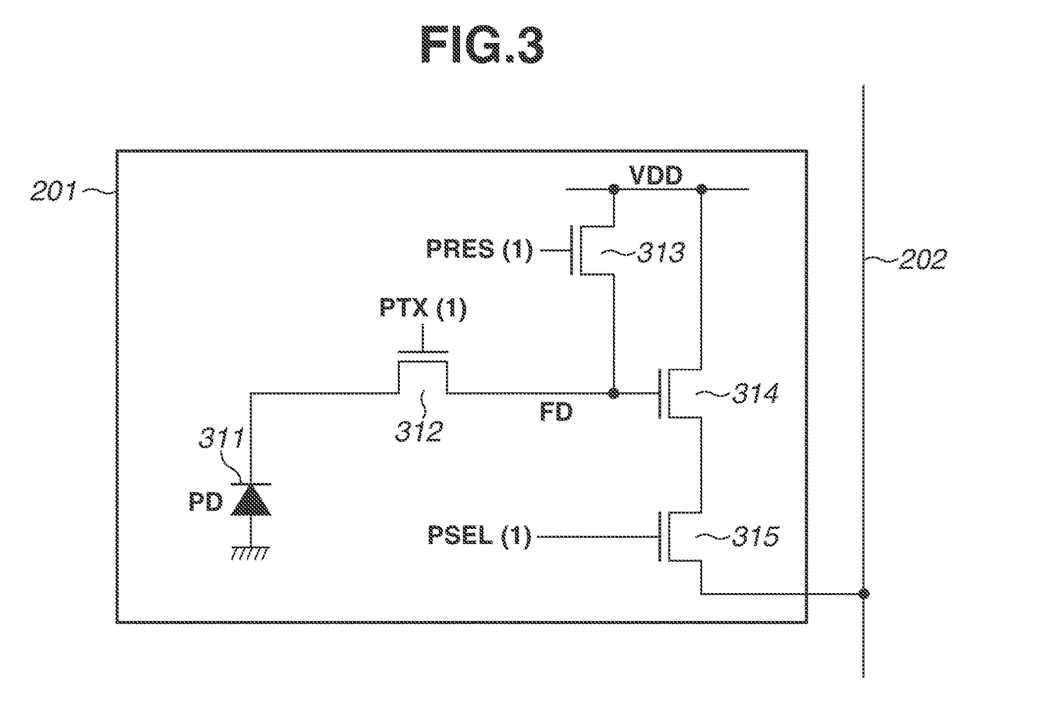
FIG. 3 is a schematic diagram of a pixel of the image capturing apparatus according to the first exemplary embodiment.

FIG. 3 illustrates an equivalent circuit as a configuration example of each pixel 201 of the image capturing apparatus 1 according to the present exemplary embodiment.

Each pixel 201 includes a photoelectric conversion element 311, a charge transfer unit 312, a floating diffusion unit FD (hereinafter, referred to as FD), a reset unit 313, a signal amplification unit 314, and a row selection unit 315.

Light incident on the photoelectric conversion element 311 causes electric charge to be generated through photoelectric conversion. The photoelectric conversion element 311 accumulates the generated electric charge as a signal charge.

The charge transfer unit 312 is a transfer transistor to read the electric charge accumulated in the photoelectric conversion element 311 and is connected between the photoelectric conversion element 311 and the FD. Conduction/non-conduction (on/off) of the charge transfer unit 312 is controlled by a pixel transistor signal PTX(1) input to the gate thereof.

The reset unit 313 is a reset transistor to supply a power supply voltage VDD to the FD to reset the circuit and is connected between the power supply voltage VDD and the FD. Conduction/non-conduction (on/off) of the reset unit 313 is controlled by a pixel unit reset signal PRES(1) input to the gate thereof.

The signal amplification unit 314 is a source follower transistor to convert the electric charge accumulated in the FD into a voltage, amplify, and output the voltage as a voltage signal to the corresponding vertical signal line 202. The FD is connected to the gate terminal of the signal amplification unit 314, and the power supply voltage VDD and the row selection unit 315 are connected to the drain terminal and the source terminal of the signal amplification unit 314, respectively.

The row selection unit 315 is a transistor to select the row to which pixel signals are output and is connected between the output of the signal amplification unit 314 and the vertical signal line 202. Conduction/non-conduction (on/off) of the row selection unit 315 is controlled by a row selection signal PSEL(1) input to the gate thereof.

A method will be now described of reading noise data (hereinafter, also referred to as N data) from each pixel 201, then reading signal data (hereinafter, also referred to as S data), and acquiring effective data obtained by deleting the N data from the S data.

First, the reset unit 313 resets the FD, and the electric charge stored in the FD after the reset release is read via the signal amplification unit 314, which is taken as the N data. In other words, the reset noise of the FD is read as the N data. The electric charge stored in the photoelectric conversion element 311 after the N data is read is transferred to the FD by the charge transfer unit 312. The electric charge stored in the FD through the transfer is read via the signal amplification unit 314, which is taken as the S data. In other words, the sum of effective signal data based on the electric charge stored in the photoelectric conversion element 311 and the reset noise of the FD is the S data.

Correlated double sampling (CDS) processing of subtracting the N data (the reset noise) from the S data produces the effective data about each pixel 201.

(Column Circuit)

The configuration of a column circuit according to the present exemplary embodiment will be described.

Figure 4:
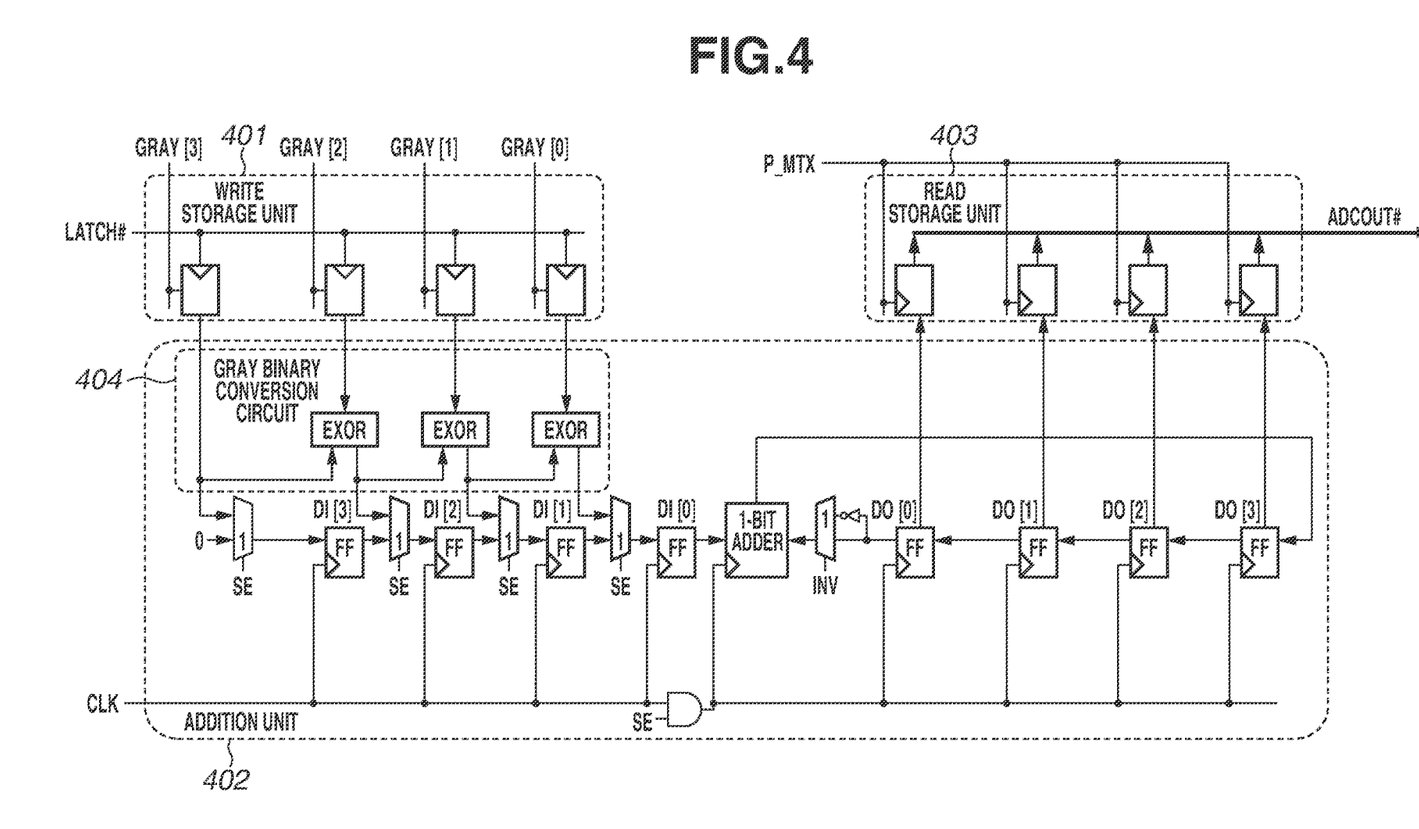
FIG. 4 is a schematic diagram of a column memory of the image capturing apparatus according to the first exemplary embodiment.

FIG. 4 illustrates a configuration example of each column memory 204 of the image capturing apparatus 1 according to the present exemplary embodiment.

Each column memory 204 includes a write storage unit 401, an addition unit 402, and a read storage unit 403. An output of the write storage unit 401 is input to the addition unit 402. An output of the addition unit 402 is input to the read storage unit 403. The configuration will be now described in detail.

The write storage unit 401 is a circuit that can store the gray code GRAY at the timing when the output LATCH #becomes High.

The addition unit 402 is a serial binary adder. The addition unit 402 includes flip-flops (FFs) (DI[3] to DI[0]) (hereinafter, referred to as DI) to mainly store input data, a 1-bit adder, and FFs (DO[3] to DO[0]) (hereinafter, referred to as DO) to store output data. Further, a gray binary conversion circuit 404 is provided between the input terminals of the DIs and the output terminals of the write storage unit 401.

The DI can perform a "shift operation" to enter input data to the 1-bit adder sequentially from a low-order bit. Further, the DI can switch an "operation of converting a gray code stored in the write storage unit 401 into a binary code" and the "shift operation" with a signal SE.

The 1-bit adder includes a full adder and a carry bit storing FF.

The DO can perform a "shift operation" to store the output of the 1-bit adder sequentially from a low-order bit. Further, the DO can perform bit flip on an output of the DO[0] with a signal INV and then input the result to the 1-bit adder.

The signal SE also has a clock stop function for the 1-bit adder and the DO.

The read storage unit 403 is a circuit that can store a value of the DO with a signal P_MTX at High. An output of the read storage unit 403 is an output ADCOUT # of the column memory 204.

A method will be now described of driving the photoelectric conversion apparatus according to the present exemplary embodiment.

(Driving Method: Single Sampling)

Figure 5:
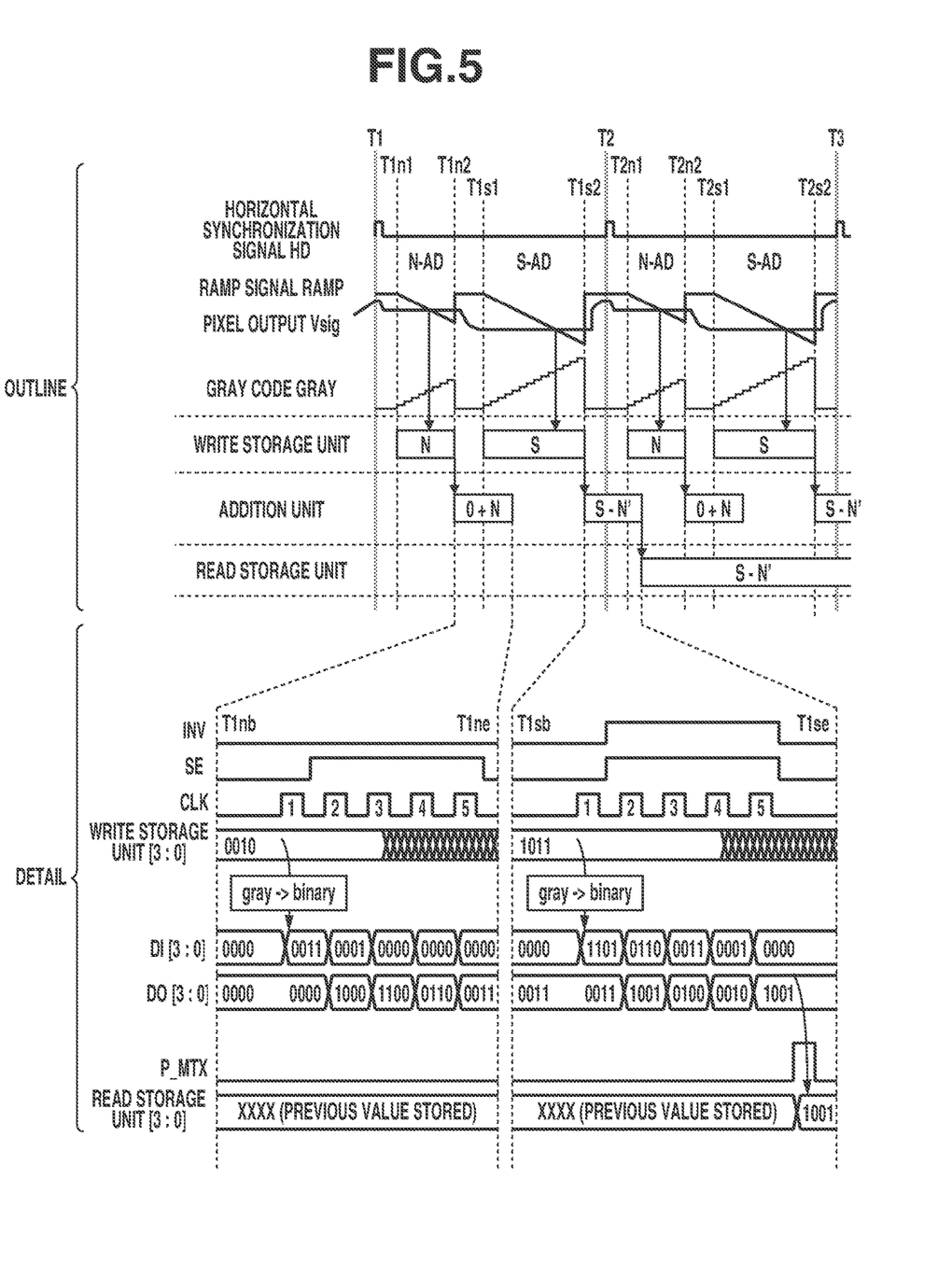
FIG. 5 is a timing chart illustrating the operation of the column AD conversion unit of the image capturing apparatus according to the first exemplary embodiment.

FIG. 5 is a timing chart illustrating an example of the operation of the column AD conversion unit 105 of the image capturing apparatus 1.

An outline of the operation of the column AD conversion unit 105 is illustrated in the upper part of FIG. 5, and details of the operation of the column memory 204 are illustrated in the lower part of FIG. 5.

First, the outline of the operation of the column AD conversion unit 105 will be described with reference to the upper part of FIG. 5.

The following is a description of the operation of performing AD conversion on a signal output from each pixel 201 in the first row and outputting digital data corresponding to the signal as a digital signal ADCOUT #.

At a time T1, the CPU 101 outputs a horizontal synchronization signal HD to the control unit 102.

From a time T1$n$1 to a time T1$n$2, the column AD conversion unit 105 simultaneously performs AD conversion on the N data about the pixels 201 of all the columns in the first row. The AD conversion is governed by two circuits. First, each column comparator 203 compares a pixel output Vsig with the ramp signal RAMP and outputs an output LATCH #. Next, the write storage unit 401 in each column memory 204 stores the gray code GRAY at the timing when the output LATCH # becomes High. The N data converted into a digital signal by the AD conversion is referred to as N.

From the time T1$n$2, the addition unit 402 in each column memory 204 operates to perform the addition processing of 0 (an initial value)+N. The operation will be described in detail below.

From a time T1$s$1 to a time T1$s$2, the column AD conversion unit 105 simultaneously performs AD conversion on the S data about the pixels 201 of all the columns in the first row. At that time, the AD conversion processing on the S data in the first row started from the time T1$s$1 and the addition processing (0+N) on the N data in the first row are simultaneously performed, making the periods of both types of processing overlap with each other, providing a shorted cycle of one frame. The period of AD conversion processing on the S data and the period of the addition processing on the N data may entirely coincide with each other, or one processing period may entirely coincide with a part of the other processing period. A part of one processing period may overlap with a part of the other processing period.

The AD conversion processing on the S data is similar to the AD conversion processing on the N data. The S data converted into a digital signal by the AD conversion is referred to as S.

From the time T1$s$2, the addition unit 402 in the column memory 204 operates to perform subtraction processing of S−N'(N'=N+1). The operation will be described in detail below. After the subtraction processing is completed, the output (S−N') of the addition unit 402 is transferred to the read storage unit 403.

Then, the value of S−N' in the read storage unit 403 is held for the period corresponding to the cycle of the horizontal synchronization signal HD.

The stored S−N' value is sequentially output via the horizontal transfer unit 106 as the digital signal ADCOUT # of the read storage unit 403.

From a time T2, the AD conversion is similarly performed on signals output from the pixels 201 in the second row. At that time, the AD conversion processing on the N data in the second row started from a time T2$n$1 and the subtraction processing (S−N') in the first row are performed in periods that overlap with each other, providing a shorted cycle of the horizontal synchronization signal HD.

The details of the operation of the column memory 204 will be now described with reference to the lower part of FIG. 5. The case of the N data=3, the S data=13, and S−N'=9 (N'=N+1) will be described by way of example.

In the following description, a gray code and a binary code are referred to as GXXXX (X is 0 or 1) and BXXXX (X is 0 or 1), respectively.

At a time T1$nb$, the gray code (G0010) as the N data (it is 3 in the present exemplary embodiment) is stored in the write storage unit 401.

At the time of the first rise of a signal CLK, the signal SE is Low. The DI converts the gray code (G0010) in the write storage unit 401 into a binary code (B0011) and stores it as binary data. The DO does not operate because the clock is stopped with the signal SE.

Over the second to fifth rises of the signal CLK, the signal SE is High, and the signal INV is Low. The DI (B0011) and the DO (B0000) perform the addition processing {DI (3=B0011)+DO (0=B0000)} while performing the shift operation in synchronization with the signal CLK.

Thus, at a time T1$ne$, the DO (3=B0011) is stored.

The addition processing will be now described in more detail. As described above, the addition unit 402 includes the 1-bit adder provided with the full adder and the carry bit storing FF. The digits of the DI (3=B0011) each are stored in the DI[3] to the DI[0], respectively, and the digits of the DO (0=B0000) each are stored in the DO[3] to the DO[0], respectively.

If the digits of the DI and the DO each are shifted by one digit according to the signal CLK, the least significant bit of the DI (3=B0011) and the least significant bit of the DO (0=B0000) are input to the full adder and added. The carry bit storing FF stores the carry. At the next signal CLK, the bit at the second digit from the least significant bit of the DI (3=B0011) and the bit at the second digit from the least significant bit of the DO (0=B0000) are input to the full adder and added.

The described above shift operation enables data to be sequentially input to the adder from the lower order bit. The adder described above has a K clock cycle to add K bits.

At a time T1*sb*, the gray code (G1011) as the S data (it is 13 in the present exemplary embodiment) is stored in the write storage unit 401.

Next, at the time of the first rise of the signal CLK, the signal SE is Low. The DI converts the gray code (G1011) in the write storage unit 401 into a binary code (B1101) and stores it as binary data. The DO does not operate as the clock is stopped with the signal SE.

Over the second to the fifth rises of the signal CLK, the signal SE is High, and the signal INV is High. The output of the DO[0], namely, the N data, is bit-flipped by the signal INV and is input to the 1-bit adder. The DI (B1101) and the DO (B1100), which is the bit-flipped DO (B0011), are added while performing the shift operation in synchronization with the signal CLK, and thus the subtraction processing {DI (13=B1101)–DO (3=B0011)–1} is performed.

Thus, at a time T1*se*, the DO (9=B1001) is stored.

At the time T1*se*, the subtraction processing of S–N' (N'=N+1) is completed.

Correlated double sampling processing can be performed by correcting the obtained S–N'(N'=N+1) to S–N in a subsequent process.

As described above, according to the present exemplary embodiment, the circuit scale is reduced by using the 1-bit adder as a circuit to perform the subtraction processing of S–N. The smaller circuit scale reduces the power consumed by the circuit. In addition, enlarging each pixel with the size of the entire image capturing apparatus left unchanged provides a higher image quality.

Further, The overlapped periods of "AD conversion of the N data" and "S–N subtraction processing" shortens the period of one frame.

According to the present exemplary embodiment, a column circuit is provided that can perform addition processing with high speed with a lower power consumption and a smaller circuit scale.

Use of the gray code that shifts by one bit prevents a value in the middle of shift operation from being input to the memory and reduces the error down to one least significant bit (LSB). That reduces noise, which is expected to improve image quality, and also the fewer shifting points and lower maximum frequency reduces power consumption.

According to the present exemplary embodiment, the gray code is used in the description, but a code to be used is not limited to the gray code. A similar effect can be expected if the code has a Hamming distance of one between adjacent count values.

A second exemplary embodiment will be described. According to the first exemplary embodiment, the image capturing apparatus performs the S–N process (subtraction processing) using the 1-bit adder by way of example. According to the present exemplary embodiment, an example of an application to multiple sampling operation (N data and S data are respectively AD-converted and added a plurality of times) using an image capturing apparatus identical to that according to the first exemplary embodiment will be described with reference to FIG. 6.

The configuration of the image capturing apparatus (FIGS. 1 to 4) is similar to that according to the first exemplary embodiment. Like numbers refer to like elements in FIGS. 5 and 6, and thus redundant descriptions thereof will be omitted. Parts different from the first exemplary embodiment will be mainly described.

The following is a description of a method of driving a photoelectric conversion apparatus according to the second exemplary embodiment.

(Driving Method: Multiple Sampling)

Figure 6:
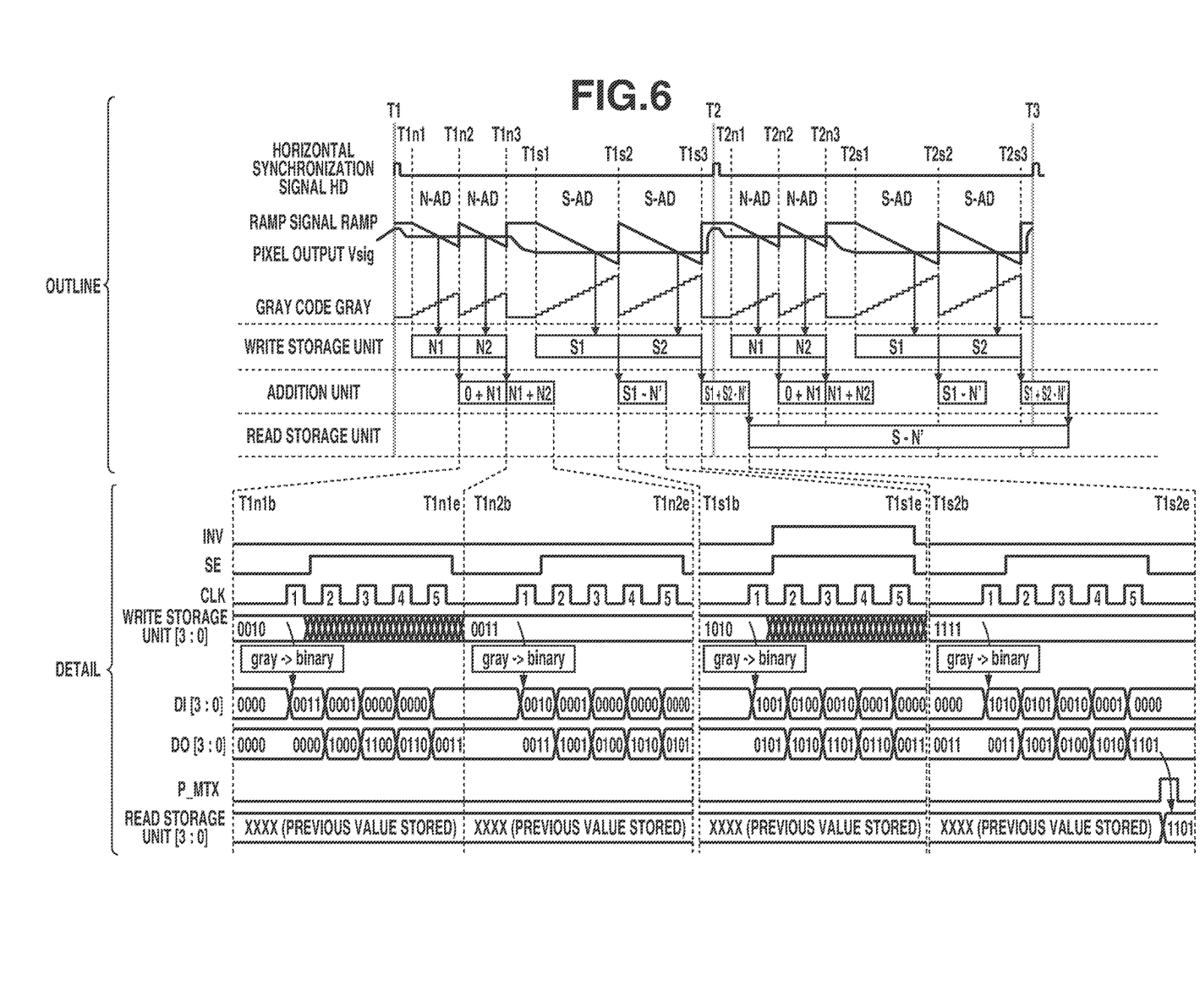
FIG. 6 is a timing chart illustrating the operation of a column AD conversion unit of an image capturing apparatus according to a second exemplary embodiment.

FIG. 6 is a timing chart illustrating an example of the operation of the column AD conversion unit 105 in the image capturing apparatus according to the second exemplary embodiment.

An outline of the operation of the column AD conversion unit 105 is illustrated in the upper part of FIG. 6, and details of the operation of the column memory 204 are illustrated in the lower part of FIG. 65.

First, the outline of the operation of the column AD conversion unit 105 will be described with reference to the upper part of FIG. 6.

The operation of performing AD conversion on a signal output from each pixel 201 in the first row and outputting digital data corresponding to the signal as a digital signal ADCOUT #will be described.

At a time T1, the CPU 101 outputs a horizontal synchronization signal HD to the control unit 102.

From a time T1*n*1 to a time T1*n*2, the first AD conversion on the N data is performed. The obtained N data is referred as N1. The operation of the column AD conversion unit 105 is similar to that according to the first exemplary embodiment.

From the time T1*n*2, the addition unit 402 in each column memory 204 operates to perform the addition processing of 0 (the initial value)+N1. The operation will be described in detail below. At the same time, from the time T1*n*2 to a time T1*n*3, the second AD conversion on the N data is performed. The obtained N data is referred as N2. The operation of the column AD conversion unit 105 is similar to that according to the first exemplary embodiment.

From a time T1*n*3, the addition unit 402 of the column memory 204 operates to perform the addition processing of N1+N2. The operation will be described in detail below.

From a time T1*s*1 to a time T1*s*2, the first AD conversion on the S data is performed. The obtained S data is referred as S1. The AD conversion operation on the S data is similar to the AD conversion operation on the N data.

From the time T1*s*2, the addition unit 402 in the column memory 204 operates to perform the subtraction processing of S1–N' (N'=N1+N2+1). The operation will be described in detail below. At the same time, from the time T1*s*2 to a time T1*s*3, the second AD conversion on the S data is performed. The obtained S data is referred as S2. The operation of the column AD conversion unit 105 is similar to the AD conversion operation on the N data.

From a time T1*s*3, the addition unit 402 in the column memory 204 operates to perform the addition processing of (S1–N')+S2. The operation will be described in detail below.

After the addition processing is completed, the output S–N' (S=S1+S2, N'=N1+N2+1) of the addition unit 402 is transferred to the read storage unit 403.

Then, the value of S–N' in the read storage unit 403 is held for the period corresponding to the cycle of the horizontal synchronization signal HD.

The stored S–N' value is sequentially output via the horizontal transfer unit 106 as the digital signal ADCOUT #in the read storage unit 403.

From a time T2, the AD conversion is similarly performed on signals output from the pixels 201 in the second row. At that time, the AD conversion processing on the N data in the second row started from a time T2*n*1 and the addition processing ((S1–N')+S2) in the first row are performed in periods that overlap with each other, providing a shortened cycle of one frame.

The details of the operation of the column memory 204 will be now described with reference to the lower part of FIG. 6. The case of the N1 data=3, the N2 data=2, the S1 data=9, the S2 data=10, and S−N'=13 (S=S1+S2, N'=N1+N2+1) will be described by way of example.

In the following description, a gray code and a binary code are respectively referred to as GXXXX (X is 0 or 1) and BXXXX (X is 0 or 1) as with the first exemplary embodiment.

At a time T1*n*1*b*, a gray code (G0010) as the N1 data (it is 3 in the present exemplary embodiment) is stored in the write storage unit 401. The addition processing of 0 (the initial value)+N will be now described.

At the time of the first rise of a signal CLK, the signal SE is Low. The DI converts the gray code (G0010) in the write storage unit 401 into a binary code (B0011) and stores it.

The DO does not operate as the clock is stopped with the signal SE.

Over the second to the fifth rises of the signal CLK, the signal SE is High, and the signal NV is Low. The DI (B0011) and a DO (B0000) perform the shift operation in synchronization with the signal CLK and are input to the full adder by one bit from the least significant bit, so that the addition processing (DI+DO) is performed.

Thus, at a time T1*n*1*e*, the DO (3=B0011) is stored as the result of the addition processing of 0 (the initial value)+N.

At a time T1*n*2*b*, a gray code (G0011) as the N2 data (it is 2 in the present exemplary embodiment) is stored in the write storage unit 401. The addition processing of N1+N2 will be now described.

At the time of the first rise of the signal CLK, the signal SE is Low. The DI converts the gray code (G0011) in the write storage unit 401 into a binary code (B0010) and stores it. The DO does not operate as the clock is stopped with the signal SE.

Over the second to the fifth rises of the signal CLK, the signal SE is High, and the signal INV is Low. The DI (B0010) and the DO (B0011) perform the shift operation in synchronization with the signal CLK and are input to the full adder by one bit from the least significant bit, so that the addition processing (DI+DO) is performed.

Thus, at a time T1*n*2*e*, the DO (5=B0101) is stored as the result of the addition processing of N1+N2.

At a time T1*s*1*b*, a gray code (G1010) as the S1 data (it is 9 in the present exemplary embodiment) is stored in the write storage unit 401. The subtraction processing of S1−(N1+N2+1) will be now described.

Next, at the time of the first rise of the signal CLK, the signal SE is Low. The DI converts the gray code (G1010) in the write storage unit 401 into a binary code (B1001) and stores it. The DO does not operate as the clock is stopped with the signal SE.

Over the second to the fifth rises of the signal CLK, the signal SE is High, and the signal INV is High. The output of the DO, namely, the N data, is bit-flipped by the signal INV and input to the 1-bit adder. The DI (B1001) and the DO (B1010) as the bit-flipped DO (B0101) are added while performing the shift operation in synchronization with the signal CLK, and thus the subtraction processing (Di−DO−1) is performed.

Thus, at a time T1*s*1*e*, the DO (3=B0011) is stored as the result of the subtraction processing of S1−(N1+N2+1).

At a time T1*s*2*b*, a gray code (G1111) as the S2 data (it is 10 is the present exemplary embodiment) is stored in the write storage unit 401. The addition processing of {S1−(N1+N2+1)}+S2 will be now described.

Next, at the time of the first rise of the signal CLK, the signal SE is Low. The DI converts the gray code (G1111) in the write storage unit 401 into a binary code (B1010) and stores it. The DO does not operate as the clock is stopped with the signal SE.

Over the second to the fifth rises of the signal CLK, the signal SE is High, and the signal INV is Low. The DI (B1010) and the DO (B0011) perform the shift operation in synchronization with the signal CLK and are input to the full adder by one bit from the least significant bit, so that the addition processing (DI+DO) is performed.

Thus, at a time T1*s*2*e*, the DO (13=B1101) is stored.

At the time T1*s*2*e*, the subtraction processing of S−N' (S=S1+S2, N'=N1+N2+1) is completed.

As described above, according to the present exemplary embodiment, the 1-bit adder is used as a circuit to perform the addition processing (for example, N1+N2) and the subtraction processing of S−N in the multiple sampling, providing a smaller circuit scale, with a reduced power consumption.

Further, enlarging the pixel in a smaller circuit scale with the entire image capturing apparatus left unchanged provides a higher image quality.

Further, the overlapped periods of "AD conversion" and "addition processing" or "subtraction processing" shortens the period of one frame.

Thus, according to the present exemplary embodiment, a column circuit is provided that can perform addition and subtraction processing with high speed and with a lower power consumption and a smaller circuit scale.

According to the present exemplary embodiment, the example of the multiple sampling in which the number of sampling times is two has been described. However, the number of sampling times is not limited to two, and the same circuit is applicable to three or more sampling times, and can perform subtraction processing on cumulative signal data and cumulative noise data. However, the number of bits of the addition unit 402 and the read storage unit 403 varies with the range of AD conversion and/or the number of sampling times.

Figure 7:
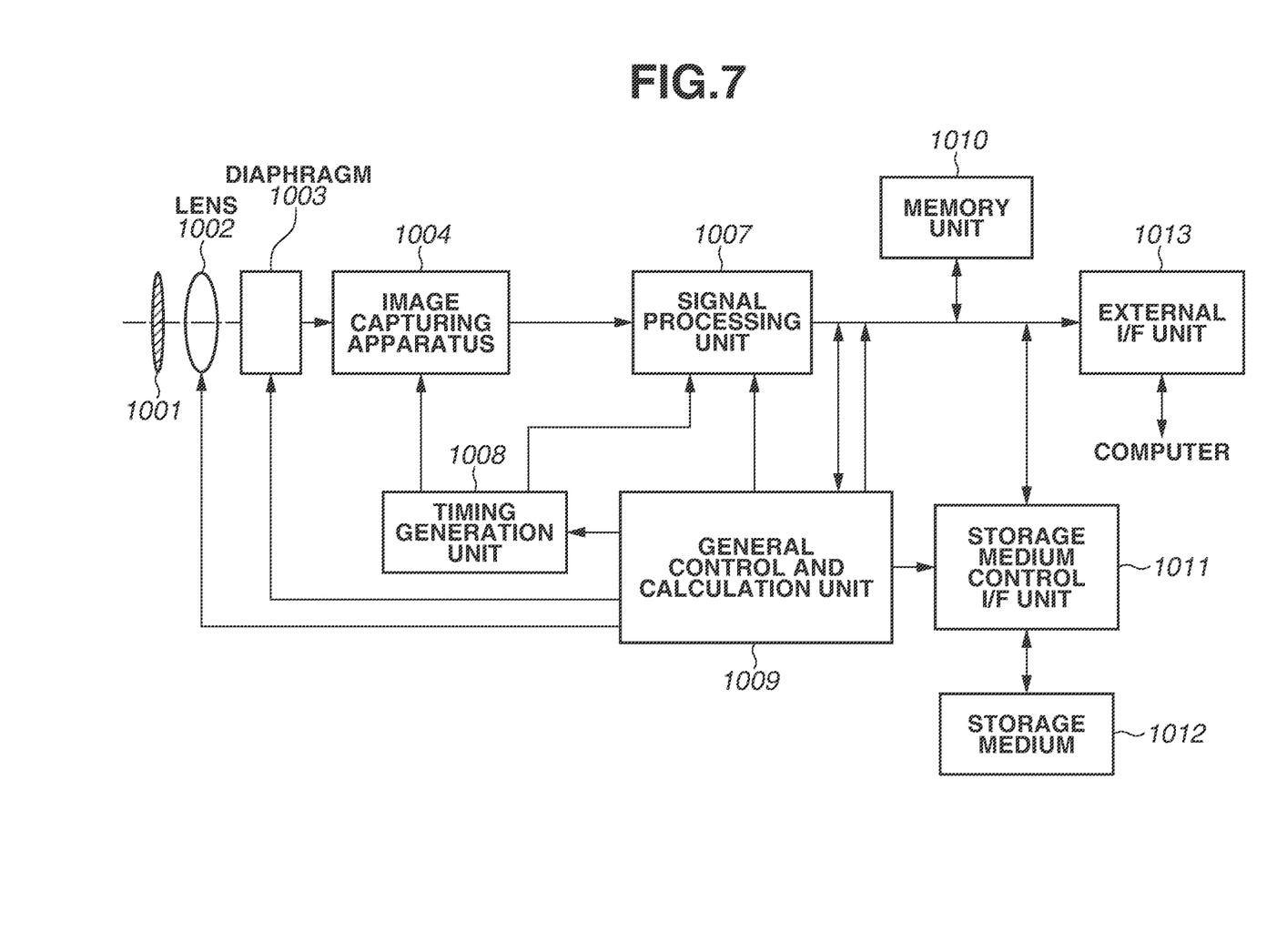
FIG. 7 illustrates the configuration of a photoelectric conversion system according to a third exemplary embodiment.

A third exemplary embodiment will be described. A photoelectric conversion system according to the present exemplary embodiment will be described with reference to FIG. 7. FIG. 7 is a block diagram illustrating a schematic configuration of the photoelectric conversion system according to the present exemplary embodiment.

The photoelectric conversion apparatus including the image capturing apparatus described according to the above-described first and second exemplary embodiments is applicable to various types of photoelectric conversion systems. Examples of applicable photoelectric conversion systems include digital still cameras, digital camcorders, monitoring cameras, copying machines, facsimiles, mobile phones, on-vehicle cameras, and observation satellites. A camera module including an optical system such as a lens and an image capturing apparatus is also included in a photoelectric conversion system. FIG. 7 is a block diagram of a digital camera as an example of the photoelectric conversion system.

The photoelectric conversion system illustrated in FIG. 7 includes an image capturing apparatus 1004 as an example of the photoelectric conversion apparatus and a lens 1002 to form the optical image of an object on the image capturing apparatus 1004. The photoelectric conversion system further includes a diaphragm 1003 to change the quantity of light passing through the lens 1002 and a barrier 1001 to protect the lens 1002. The lens 1002 and the diaphragm 1003 are optical systems to condense light on the image capturing apparatus 1004. The image capturing apparatus 1004 is the photoelectric conversion apparatus according to any of the above-described exemplary embodiments and converts the optical image formed by the lens 1002 into an electrical signal.

The photoelectric conversion system further includes a signal processing unit 1007 as an image generation unit to generate images by processing output signals output from the image capturing apparatus 1004. The signal processing unit 1007 performs various types of correction and compression on signals as appropriate to output image data. The signal processing unit 1007 may be formed on a semiconductor substrate on which the image capturing apparatus 1004 is provided or a semiconductor substrate different from the semiconductor substrate on which the image capturing apparatus 1004 is provided.

The photoelectric conversion system further includes a memory unit 1010 to temporarily store image data and an external interface (I/F) unit 1013 to communicate with an external computer and other devices. The photoelectric conversion system further includes a storage medium 1012 such as a semiconductor memory to record and read imaging data and a storage medium control I/F unit 1011 to perform recording in and reading from the storage medium 1012. The storage medium 1012 may be built in the photoelectric conversion system or may be detachable therefrom.

The photoelectric conversion system further includes a general control and calculation unit 1009 to perform various types of calculation and to generally control a digital still camera, and a timing generation unit 1008 to output various timing signals to the image capturing apparatus 1004 and the signal processing unit 1007. The various timing signals may be input from the outside, and the photoelectric conversion system may include at least the image capturing apparatus 1004 and the signal processing unit 1007, which processes output signals output from the image capturing apparatus 1004.

The image capturing apparatus 1004 outputs imaging signals to the signal processing unit 1007. The signal processing unit 1007 performs predetermined signal processing on imaging signals output from the image capturing apparatus 1004 to output image data. The signal processing unit 1007 generates images using the imaging signals.

As described above, according to the present exemplary embodiment, a photoelectric conversion system is provided that includes the photoelectric conversion apparatus (an image capturing apparatus) according to any of the above-described exemplary embodiments.

Figure 8A:
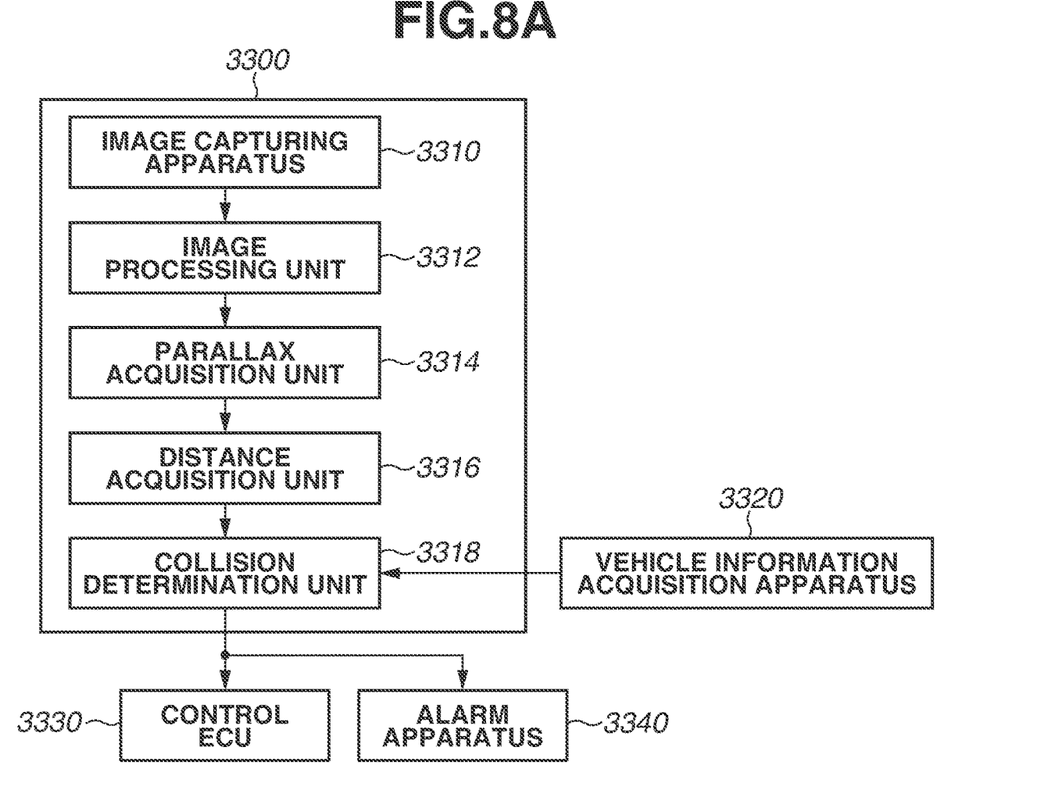
FIGS. 8A and 8B illustrate the configuration and the operation of a moving body according to a fourth exemplary embodiment.
Figure 8B:
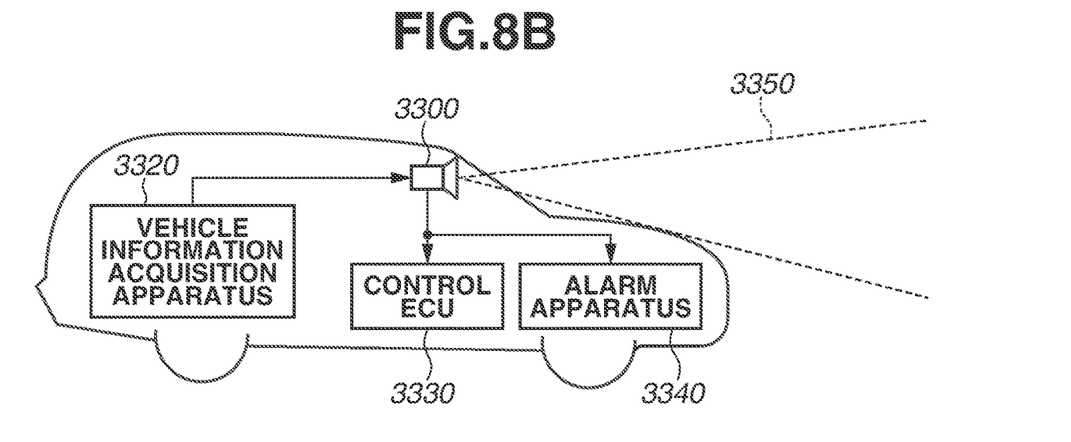

A fourth exemplary embodiment will be described. A photoelectric conversion system and a moving body according to the present exemplary embodiment will be described with reference to FIGS. 8A and 8B. FIGS. 8A and 8B illustrate configurations of the photoelectric conversion system and the moving body according to the present exemplary embodiment.

FIG. 8A illustrates an example of a photoelectric conversion system for an on-vehicle camera. A photoelectric conversion system 3300 includes an image capturing apparatus 3310. The image capturing apparatus 3310 is the photoelectric conversion apparatus according to any of the above-described exemplary embodiments. The photoelectric conversion system 3300 includes an image processing unit 3312 to perform image processing on a plurality of pieces of image data acquired by the image capturing apparatus 3310, and a parallax acquisition unit 3314 to calculate parallax (the phase difference of a parallax image) from the pieces of image data acquired by the photoelectric conversion system 3300. The photoelectric conversion system 3300 further includes a distance acquisition unit 3316 to calculate the distance to the target object based on the calculated parallax, and a collision determination unit 3318 to determine whether a collision is likely to occur based on the calculated distance. The parallax acquisition unit 3314 and the distance acquisition unit 3316 are an example of a distance information acquisition unit to acquire distance information up to the target object. In other words, the distance information is information about the parallax, the defocus amount, the distance to the target object, and other factors. The collision determination unit 3318 may determine the likelihood of a collision using any of the pieces of distance information. The distance information acquisition unit may be formed with specially designed hardware components or a software module. Further, the distance information acquisition unit may be formed with a field programmable gate array (FPGA), an application specific integrated circuit (ASIC), and a combination thereof.

The photoelectric conversion system 3300 is connected to a vehicle information acquisition apparatus 3320 to acquire vehicle information such as the vehicle speed, the yaw rate, and the steering angle. The photoelectric conversion system 3300 is also connected to a control engine control unit (ECU) 3330 as a control unit to output a control signal to produce a braking force on the vehicle based on the determination result of the collision determination unit 3318. The photoelectric conversion system 3300 is also connected to an alarm apparatus 3340 to issue an alarm to the driver based on the determination result of the collision determination unit 3318. For example, if the collision determination unit 3318 determines that a collision is highly likely to occur, the control ECU 3330 controls the vehicle to avoid the collision or reduce damage by applying a brake, releasing the accelerator, and/or reducing the engine output. The alarm apparatus 3340 warns the user by setting an alarm, displaying alarm information on the screen of the car navigation system, and/or applying vibration on the seat belt and/or the steering.

According to the present exemplary embodiment, the photoelectric conversion system 3300 captures images of surroundings, for example, in front of or behind the vehicle. FIG. 8B illustrates the photoelectric conversion system 3300 to capture images in front of the vehicle (an image capturing range 350). The vehicle information acquisition apparatus 3320 issues instructions to the photoelectric conversion system 3300 or the image capturing apparatus 3310. The above-described configuration provides distance measurement with a higher accuracy.

The example of the control of preventing collision with another vehicle has been described above. However, the photoelectric conversion system is applicable to the control of automatic driving by following other vehicles and the control of automatic driving not to deviate from a current lane. Further, the photoelectric conversion system, not limited to moving bodies such as automobiles, is applicable to other moving bodies (moving apparatuses), for example, marine vessels, aircraft, or industrial robots.

In addition, the photoelectric conversion system, not limited to moving bodies, is applicable to devices used in wide object recognition, such as an intelligent transport system (ITS).

Modifications

The disclosure is not limited to the above-described exemplary embodiments, and various modifications are applicable.

For example, an example in which a part of the configuration of any of the exemplary embodiments is added to another exemplary embodiment and an example in which a part of the configuration of any of the exemplary embodiments is replaced with a part of another exemplary embodiment are also included in the exemplary embodiments of the disclosure.

According to the above-described first and second exemplary embodiments, the addition unit 402 has been described using the 1-bit adder but is not limited to the 1-bit adder. An adder with a bit number less than a bit number of a counter to be used in AD conversion may be used. For example, an adder with M bits (M is a natural number less than K) has an effect of providing a smaller circuit scale.

According to the first and the second exemplary embodiments, a 2-bit adder or a 3-bit adder may be used instead of the 1-bit adder.

Further, according to the first and the second exemplary embodiments, the FF is used for the addition unit 402, but the addition unit 402 can be formed with another sequential circuit such as a delayed (D) latch instead of the FF.

The photoelectric conversion systems described above in the third and the fourth exemplary embodiments are examples of the photoelectric conversion system to which the photoelectric conversion apparatus according to the disclosure is applicable, and the photoelectric conversion system to which the photoelectric conversion apparatus according to the disclosure is applicable is not limited to the configurations illustrated in FIGS. 7, 8A, and 8B.

Further, the circuit according to each of the exemplary embodiments of the disclosure may be formed on a single semiconductor substrate or may be arranged on two or more semiconductor substrates that are bonded into a multilayer structure. For example, a multilayer structure may be composed of three or more substrates on which the circuit is divided or circuits and functions are added. For example, a multilayer substrate allows the pixel unit 104 to be mounted on the upper layer substrate and other circuits (the control unit 102, the vertical scanning unit 103, the column AD conversion unit 105, the horizontal transfer unit 106, the data processing unit 107, and the signal output unit 108) to be mounted on the lower layer substrate.

The exemplary embodiments described above are mere examples for the materialization to implement the disclosure. The examples should not be construed limiting the technical scope of the disclosure. In other words, the disclosure can be implemented in the various forms without departing from the technical idea and/or the main features thereof.

According to the disclosure, a photoelectric conversion apparatus is provided that can reduce power consumption more than the conventional technique.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-215242, filed Dec. 24, 2020, which is hereby incorporated by reference herein in its entirety.

What is claimed is:

1. An apparatus comprising:
a plurality of pixels;
a comparator configured to compare an output signal of each of the plurality of pixels with a reference signal; and
a counter of K bits (K is a natural number) configured to operate in parallel with operation of the comparator, wherein the apparatus converts the output signal of each of the plurality of pixels into a digital signal using an output of the comparator and an output of the counter;
an addition unit configured to add a plurality of the digital signals,
wherein the addition unit includes a serial binary adder of M bits (M is a natural number less than K), and
wherein the serial binary adder of M bits is configured to perform addition processing and subtraction processing in a multiple sampling.

2. The apparatus according to claim 1,
wherein the serial binary adder is a 1-bit adder, and
wherein, in the addition unit, the plurality of the digital signals is added by the 1-bit adder.

3. The apparatus according to claim 2,
wherein noise data as the output signal is converted from an analog signal into a digital signal, and then signal data as the output signal is converted from an analog signal into a digital signal, and
wherein effective data related to each of the plurality of pixels is acquired by a subtraction of the digital signal of the noise data from the digital signal of the signal data.

4. The apparatus according to claim 2, further comprising a storage unit configured to store each of the plurality of the digital signals as a piece of binary data,
wherein the addition unit adds a value of each piece of binary data stored in the storage unit by one bit from a least significant bit.

5. The apparatus according to claim 4,
wherein noise data as the output signal is converted from an analog signal into a digital signal, and then signal data as the output signal is converted from an analog signal into a digital signal, and
wherein effective data related to each of the plurality of pixels is acquired by a subtraction of the digital signal of the noise data from the digital signal of the signal data.

6. The apparatus according to claim 1, wherein at least a part of a period in which the comparator operates and at least a part of a period in which the addition unit performs addition processing overlap with each other.

7. The apparatus according to claim 6,
wherein noise data as the output signal is converted from an analog signal into a digital signal, and then signal data as the output signal is converted from an analog signal into a digital signal, and
wherein effective data related to each of the plurality of pixels is acquired by a subtraction of the digital signal of the noise data from the digital signal of the signal data.

8. The apparatus according to claim 1,
wherein noise data as the output signal is converted from an analog signal into a digital signal, and then signal data as the output signal is converted from an analog signal into a digital signal, and
wherein effective data related to each of the plurality of pixels is acquired by a subtraction of the digital signal of the noise data from the digital signal of the signal data.

9. The apparatus according to claim 8, wherein the subtraction is performed by adding the digital signal of the signal data and a digital signal of flipped noise data using the addition unit.

10. The apparatus according to claim 1,
wherein the apparatus converts noise data as the output signal from an analog signal to a digital signal a plurality of times and then converts signal data as the output signal from an analog signal to a digital signal a plurality of times, wherein the addition unit calculates cumulative noise data by adding the digital signal of the noise data and calculates cumulative signal data by adding the digital signal of the signal data, and wherein data is calculated by subtracting the cumulative noise data from the cumulative signal data.

11. The apparatus according to claim 10, wherein the calculation of the subtracted data is performed by adding the cumulative signal data and the cumulative noise data of which bits are flipped.

12. The apparatus according to claim 1, wherein the counter generates a code having a Hamming distance of one between adjacent count values in synchronization with the operation of the comparator.

13. The apparatus according to claim 12, wherein the code is a gray code.

14. The apparatus according to claim 13, wherein the digital signal is a signal obtained by converting the gray code into a binary code.

15. A system comprising:
the apparatus according to claim 1; and
a processing unit configured to generate an image using a signal output from the apparatus.

16. A system comprising:
the apparatus according to claim 2; and
a processing unit configured to generate an image using a signal output from the apparatus.

17. A body provided with the apparatus according to claim 1, the body comprising:
a control unit configured to control movement of the body using a signal output from the apparatus.

18. A body provided with the apparatus according to claim 2, the body comprising:
a control unit configured to control movement of the body using a signal output from the apparatus.

19. A substrate that is laminated with another substrate having a plurality of pixels, the substrate comprising:
a comparator configured to compare an output signal of each of the plurality of pixels with a reference signal; and
a counter of K bits (K is a natural number) configured to operate in parallel with operation of the comparator,
wherein an output signal of each of the plurality of pixels is converted into a digital signal using an output of the comparator and an output of the counter;
an addition unit configured to add a plurality of the digital signals, and
wherein the addition unit includes a serial binary adder of M bits (M is a natural number less than K), and
wherein the serial binary adder of M bits is configured to perform addition processing and subtraction processing in a multiple sampling.

20. The substrate according to claim 19,
wherein the serial binary adder is a 1-bit adder, and
wherein, in the addition unit, the plurality of the digital signals is added by the 1-bit adder.

* * * * *